(12) United States Patent
Bonfanti

(10) Patent No.: US 10,451,128 B2
(45) Date of Patent: Oct. 22, 2019

(54) BELL FOR BRAKE DISC WITH INTEGRATED AUXILIARY BRAKE

(71) Applicant: BREMBO SGL CARBON CERAMIC BRAKES S.P.A., Stezzano (BG) (IT)

(72) Inventor: Roberto Bonfanti, Curno (IT)

(73) Assignee: BREMBO SGL CARBON CERAMIC BRAKES S.P.A., Stezzano (IT)

( * ) Notice: Subject to any disclaimer, the term of this patent is extended or adjusted under 35 U.S.C. 154(b) by 0 days.

(21) Appl. No.: 15/906,675

(22) Filed: Feb. 27, 2018

(65) Prior Publication Data

US 2018/0245647 A1 Aug. 30, 2018

(30) Foreign Application Priority Data

Feb. 28, 2017 (IT) .......................... 102017000022637

(51) Int. Cl.
*F16D 65/12* (2006.01)
*B60T 1/06* (2006.01)
(Continued)

(52) U.S. Cl.
CPC ............ *F16D 65/123* (2013.01); *B60T 1/065* (2013.01); *B60T 1/067* (2013.01); *F16D 63/004* (2013.01);
(Continued)

(58) Field of Classification Search
CPC .................. F16D 65/123; F16D 63/004; F16D 2065/1304; F16D 65/125;
(Continued)

(56) References Cited

U.S. PATENT DOCUMENTS 5,385,216 A 1/1995 Kulczycki
5,590,742 A * 1/1997 Gutelius ................. F16D 55/22
188/205 R
(Continued)

FOREIGN PATENT DOCUMENTS

DE 10 2007 015 510 10/2007
DE 10 2007 053 576 5/2009
(Continued)

OTHER PUBLICATIONS

Translation of document No. EP 1128083 obtained from website: https://worldwide.espacenet.com/ on Feb. 11, 2019.*
(Continued)

*Primary Examiner* — Pamela Rodriguez
(74) *Attorney, Agent, or Firm* — Nixon & Vanderhye P.C.

(57) ABSTRACT

A bell for brake disc with integrated "drum-in-hat" auxiliary brake. The bell (2) includes an annular flange (5) configured to be coupled to a braking band (4) of a brake disc (1), and a drum (6) coupled coaxially to the annular flange (5), wherein the drum (6) accommodates or is configured to accommodate an auxiliary brake (7). The annular flange (5) and the drum (6) are separate elements joined together. The annular flange (6) has at least one recess (13). The drum (6) comprises a cylindrical body (14) and an auxiliary annular flange (15) positioned on a peripheral edge of the cylindrical body (14). The recess (13) has an annular shape coaxial with a common symmetry axis (X-X) and houses the auxiliary annular flange (15).

9 Claims, 4 Drawing Sheets

(51) Int. Cl.
*F16D 63/00* (2006.01)
*F16D 65/02* (2006.01)

(52) U.S. Cl.
CPC .... *F16D 65/125* (2013.01); *F16D 2065/1304* (2013.01); *F16D 2065/1344* (2013.01); *F16D 2065/1356* (2013.01); *F16D 2200/003* (2013.01); *F16D 2200/0013* (2013.01); *F16D 2200/0021* (2013.01)

(58) Field of Classification Search
CPC ..... F16D 2065/1344; F16D 2065/1356; F16D 2200/0013; F16D 2200/0021; F16D 2200/003; B60T 1/065; B60T 1/067

USPC ...... 188/70 R, 71.1, 71.3, 72.1, 73.1, 106 A, 188/106 F, 325, 329, 330, 343
See application file for complete search history.

(56) References Cited

U.S. PATENT DOCUMENTS

| | | | |
|---|---|---|---|
| 6,360,852 B1 * | 3/2002 | Sherman, II | F16D 63/004 |
| | | | 188/327 |
| 6,637,553 B1 | 10/2003 | Hale | |
| 2007/0029146 A1 | 2/2007 | Huang | |
| 2007/0227840 A1 | 10/2007 | Smith et al. | |
| 2008/0217116 A1 | 9/2008 | Bonfanti et al. | |
| 2017/0074337 A1 | 3/2017 | Borner et al. | |

FOREIGN PATENT DOCUMENTS

| | | | |
|---|---|---|---|
| DE | 10 2010 037 123 | | 2/2012 |
| EP | 1 128 083 | | 8/2001 |
| JP | 2005030431 A | * | 2/2005 |
| KR | 10-2015-0076790 | | 7/2015 |

OTHER PUBLICATIONS

Search Report for IT Application No. 102017000022637, dated Nov. 14, 2017, 16 pages.

* cited by examiner

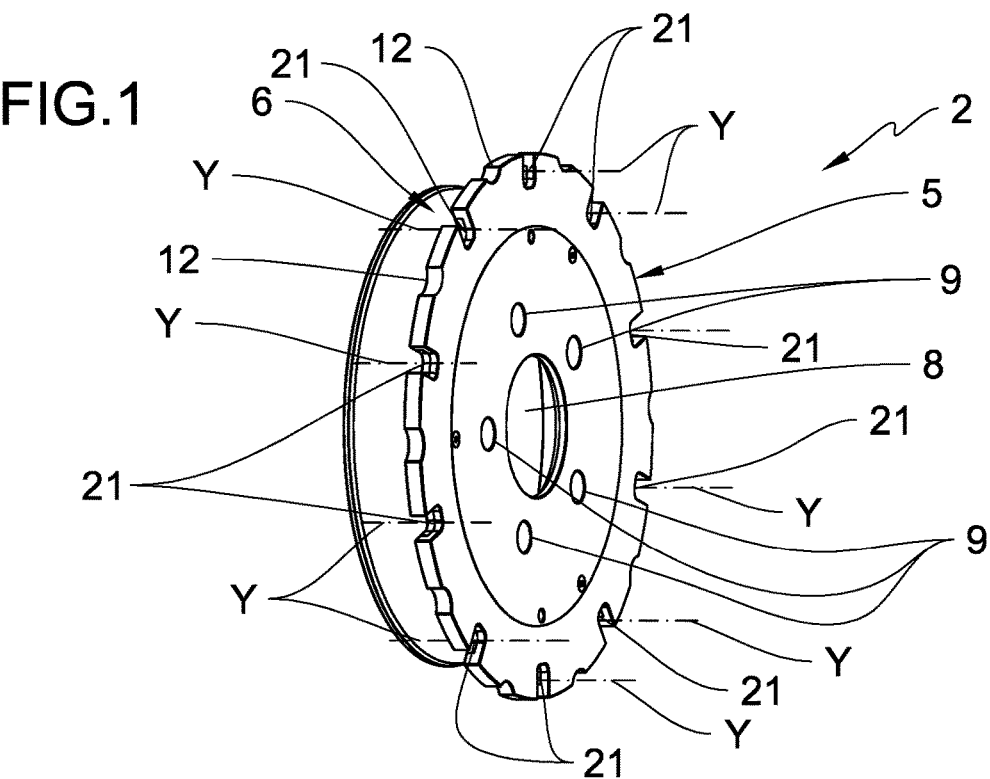
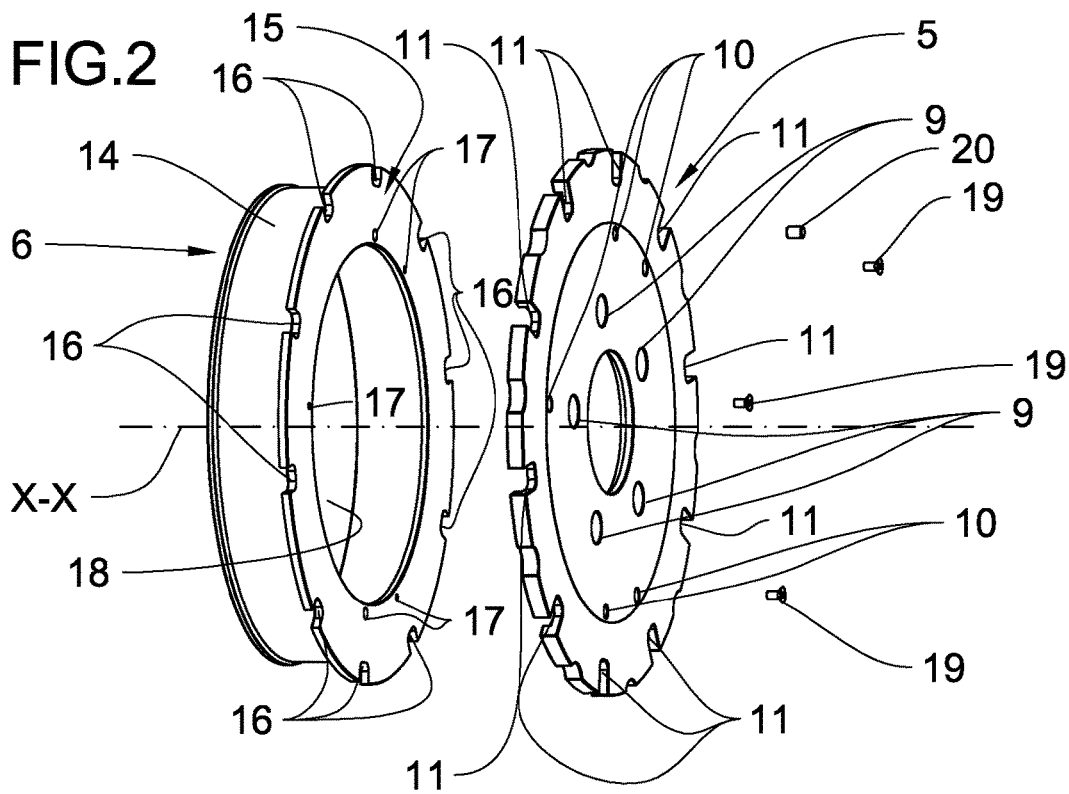

//  BELL FOR BRAKE DISC WITH INTEGRATED AUXILIARY BRAKE

RELATED APPLICATION

This application claims priority to Italian Patent Application 102017000022637 filed Feb. 28, 2017, the entirety of which is incorporated by references.

FIELD OF THE INVENTION

Disclosed herein is an invention of a bell for a brake disc provided with an integrated auxiliary brake, a brake disc and a braking system comprising such bell. The invention in particular relates to brake discs which also integrate the function of emergency and/or parking brake actuated by means of an auxiliary brake, usually of drum type, accommodated in the bell. Such brake type is known with the term "drum-in-hat". More particularly, the invention relates to brake discs, normally employed in high-performance vehicles, provided with a braking band or crown made of composite material with carbonaceous matrix, inside which and coaxially therewith the bell is provided which is integrally connected thereto. More particularly, the invention relates to optimizing the structure of the bell that houses the auxiliary brake.

BACKGROUND OF THE INVENTION

As is known, a disc brake is provided with a bell for the connection of a wheel to the hub, and with a braking band which is mounted on the bell and is extended around it. The braking band cooperates with a brake caliper which acts by friction against braking surfaces of the braking band. As is also known, a disc braking system of "drum-in-hat" type comprises an auxiliary (parking and/or emergency) brake, usually of drum type, accommodated within the bell of the disc brake. The auxiliary brake comprises a support plate which supports the brake shoes of the drum brake and is integral with the vehicle. The brake shoes are placed within the bell and, when the auxiliary brake is actuated, they act against an inner surface of the bell in order to exert a braking force by friction.

For example, U.S. Pat. No. 6,637,553 illustrates a disc braking system of "drum-in-hat" type provided with a disc service brake and a parking and emergency drum brake accommodated within the rotor that bears the disc of the disc brake. The parking and emergency drum brake comprises a support plate which supports the brake shoes of the drum brake and also arms which bear the caliper of the disc brake.

SUMMARY OF THE INVENTION

In the constant evolution of high-technology braking systems, especially for high-performance vehicles, the Applicant is constantly seeking solutions aimed to respect, on one hand, the basic principle of the reduction of inertia of the unsprung masses (the brake discs being part thereof) and, on the other hand, to achieve solutions that safe and effective.

Applicant observed that the known bells of "drum-in-hat" type have greater size and weight than the bells of the conventional brake discs which lack an auxiliary brake. The bells for drum-in-hat brakes must provide space to accommodate auxiliary brake and thus tend to be heavy and large.

In addition, the size of the bells is necessary for the purpose of correctly sizing the auxiliary brake (in particular the brake shoes and the inner surfaces of the bell configured for interacting by friction with said brake shoes) so that said auxiliary brake offers the necessary braking force.

Overall, then the weight of a brake disc of "drum-in-hat" type is decidedly greater than that of a simple brake disc, since the drum-in-hat type brake integrates the auxiliary braking system. The heavy weight of the brake disc of "drum-in-hat" type, especially those with braking band made of composite material, is at odds with customer preferences for lighter braking systems.

Applicant has therefore invented a brake disc of "drum-in-hat" type that allows optimizing the ratio between the braking force exerted by the auxiliary brake and the inertia of the unsprung masses.

In an embodiment, the invention has reduced weight and inertia of the rotary part of the brake discs of "drum-in-hat" type. In addition, the invention may be embodied to reduce the overall weight (unsprung masses) of the "drum-in-hat" brake discs. Further, the invention may be embodied to maintain or even increase the interface area between the brake shoes and the bell to optimize the effectiveness of the auxiliary brake. In addition, the invention may be embodied to achieve a solution which also allows application, by substituting only the bell, on existing disc brakes of "drum-in-hat" type.

The Applicant has invented a bell of the "drum-in hat" brake disc having two parts: a drum, configured to accommodate the auxiliary brake, and an annular flange, configured to be coupled to the braking band of the brake disc, possibly together with part of the drum.

More specifically, according to a first embodiment, the invention may be a bell for brake disc, wherein the brake disc is of the type with integrated "drum-in-hat" auxiliary brake.

The bell comprises:

an annular flange configured to be coupled to a braking band of a brake disc;

a drum coupled coaxially to the annular flange, wherein the drum accommodates or is configured to accommodate an auxiliary brake.

The annular flange and the drum may be made as separate elements joined one to the other. The drum and the annular flange may be made of different materials, and the bell may be metallic.

In one aspect, the annular flange is made of a material with a specific weight lower than a material of the drum. The annular flange may be made of a light alloy, such as aluminum. The drum may be made of steel, such as stainless steel, or cast iron and varnished.

This solution allows maintaining the size and/or tribological characteristics of the parts of the drum which accommodate the auxiliary brake and which interact with the brake shoes of said auxiliary brake and simultaneously allows reducing the weight of the assembly and hence the inertia of the unsprung as well as rotational masses.

In addition, this solution allows conferring the same external appearance of the conventional brake discs to the assembly, without auxiliary brake and with bell entirely made of aluminum.

This solution also allows making lighter "drum-in-hat" brake discs that can easily substitute those known that are already installed on a vehicle (since they are completely interchangeable with those standard "drum-in-hat" brake discs provided with conventional bell entirely made of steel or cast iron).

In particular, the extension of the contact surfaces between the brake shoes of the auxiliary brake and the drum can be maintained equal to the extension of the known bells, reducing the overall weight, or it can be increased without increasing the unsprung masses.

In one aspect, the annular flange has at least one recess and the drum has an axial end portion inserted in said at least one recess and linked to the annular flange.

In one aspect, the drum comprises a cylindrical body and the axial end portion of the drum has an auxiliary annular flange positioned on a peripheral edge of the cylindrical body.

In one aspect, the cylindrical body and the auxiliary annular flange are made in a single piece.

In one aspect, the auxiliary annular flange is accommodated in said at least one recess.

In one aspect, said at least one recess has an annular shape coaxial with a common symmetry axis and houses the auxiliary annular flange.

In one aspect, the auxiliary annular flange is counter-shaped with respect to the recess.

In one aspect, the auxiliary annular flange lies flush in the recess.

In one aspect, the auxiliary annular flange has an outer diameter smaller than or equal to an outer diameter of the annular flange.

In one aspect, the auxiliary annular flange has an inner diameter greater than an inner diameter of the annular flange.

In one aspect, the annular recess has a depth smaller than a thickness of the annular flange, wherein the annular recess is equal to about half or less of the thickness of the annular flange.

In one aspect, the auxiliary annular flange has a thickness smaller than a thickness of the annular flange, wherein the flange thickness is equal to about half or less of the thickness of the annular flange.

The annular flange and the auxiliary annular flange, once joined together, form an overall single annular flange configured to be coupled to the braking band.

In one aspect, a first radially peripheral edge of the annular flange has a plurality of first passages.

In one aspect, the first passages are defined by notches or cuts formed on the first radially peripheral edge.

In one aspect, a second radially peripheral edge of the axial end portion of the drum has a plurality of second passages.

In one aspect, the plurality of second passages is formed on the second radially peripheral edge of the auxiliary annular flange.

In one aspect, the second passages are defined by notches or cuts.

In one aspect, each of the first passages is axially aligned with a respective second passage in order to delimit a respective single axial passage through the annular flange and the auxiliary annular flange.

In one aspect, the first passages are at least partially open in said at least one recess housing the auxiliary annular flange.

In one aspect, the auxiliary annular flange has, at the second passages, an outer diameter equal to an outer diameter of the annular flange at the first passages.

The single axial passages are configured for being coupled with connecting devices, e.g. screws, bolts, rivets, operative between the bell and the braking band, i.e. configured for joining the braking band to the bell and withstanding the mechanical and/or thermal forces and torques during operation (during braking). In particular, the transmission of the braking torque from the braking band to the bell occurs through the connecting devices and the above-mentioned single axial passages.

In an embodiment variant, the single axial passages are configured for being directly coupled with the braking band made of composite material, on which the bell is co-molded.

By co-molding, it must be commonly intended the positioning of a band of composite material, carbon-ceramic material, carbon material or other, within a suitable mold provided with casting channels. Through the casting channels and according to predetermined temperature and pressure parameters, a cast metallic material is made to flow, typically an aluminum alloy. The cast metallic material, solidifying, will come to form an unprocessed bell integral with the braking band which, once the finishing processes have been completed, will define the final bell.

In one aspect, the bell comprises screws and/or pins inserted in the annular flange and in the axial end portion to link the drum to the annular flange. Such screws or pins have the function of assembling the drum and of allowing the handling of said drum as a single piece, but they do not withstand the mechanical and thermal forces when the brake disc is in operation.

The present invention also refers to a brake disc comprising a bell and a braking band radially external thereto, wherein the braking band and said bell are extended around a common symmetry axis, wherein the bell is of the type described herein and/or claimed in at least one of the enclosed claims. Said braking band has lateral braking surfaces adapted to cooperate with a relative brake caliper which exerts a braking action with respect to the vehicle on which said brake disc is installed.

In one aspect, the brake disc comprises connecting devices (e.g. screws, bolts, rivets) operatively coupled to the braking band and to the bell, to rigidly link said braking band to said bell; wherein each of said connecting devices is placed in a first passage and in a second passage aligned with each other, i.e. in each of the single axial passages.

In one aspect, said braking band is made of composite material; wherein said bell is at least partially co-molded on said braking band; wherein a radially inner portion of the braking band is inserted in each of the single axial passages.

The present invention also refers to a braking system comprising a brake caliper and a brake disc as described and/or according to at least one of the enclosed claims.

In one aspect, the braking system comprises an auxiliary brake located within the drum of the bell.

In one aspect, the auxiliary brake is of drum type.

In one aspect, the auxiliary brake comprises at least one brake shoe or jaw configured, when the auxiliary brake is actuated, to act against an inner surface of the bell so as to exert a braking force by friction.

In one aspect, the auxiliary brake comprises a support plate integral with the vehicle, wherein the support plate bears said at least one brake shoe of the drum brake.

Further characteristics and advantages will be more evident from the following description referred to the non-limiting embodiments disclosed herein of a brake disc with integrated "drum-in-hat" auxiliary brake according to the present invention.

SUMMARY OF THE DRAWINGS

Hereinbelow the description will, as a non-limiting example, refer to the enclosed drawings in which:

FIG. 1 illustrates a bell for a brake disc provided with an integrated "drum-in-hat" auxiliary brake according to the present invention;

FIG. 2 is an exploded view of the bell of FIG. 1;

DETAILED DESCRIPTION OF AN
EMBODIMENT(S) OF THE INVENTION

Figure 3:
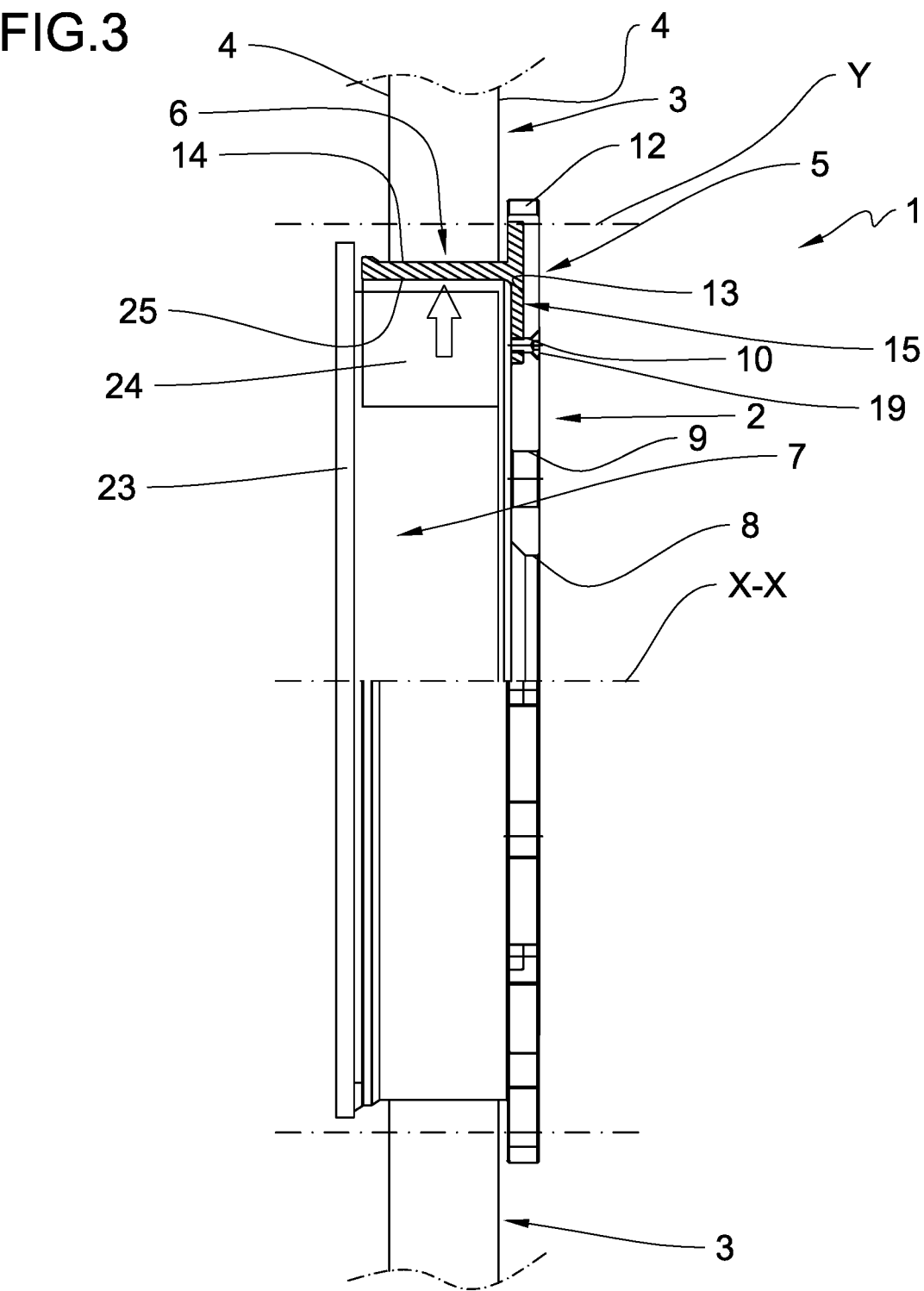
FIG. 3 shows a sectional view of the bell pursuant to FIGS. 1 and 2 associated with a "drum-in-hat" auxiliary brake and with a braking band.

With reference to FIG. 3, the numeric reference 1 overall indicates a brake disc for "drum-in-hat" braking systems according to the invention.

The brake disc 1 comprises a bell 2 and a braking band 3 radially external thereto. The bell 2 and the braking band 3 are extended around a central symmetry axis "X-X".

The braking band 3, made of composite material such as of carbon-ceramic type, is provided with two lateral braking surfaces indicated with 4, which are adapted to be engaged with a brake caliper (not shown since this is per se known) of a disc braking system.

The bell 2 is metallic and is made of two pieces with two different materials. In particular, the bell 2 comprises an annular flange 5 made of aluminum and a drum 6 made of steel or cast iron (illustrated separate in FIG. 2). The annular flange may be superficially protected, such as by anodizing. The drum 6 is made of stainless steel or of cast iron protected from corrosion by means of varnishing.

The annular flange 5 is configured for being directly coupled to the braking band 3. The drum 6 is coupled coaxially to the annular flange 5 and is configured to accommodate an auxiliary brake 7 (illustrated in FIG. 3 and detailed hereinbelow). As is visible in the enclosed figures, the annular flange 5 and the drum 6 are separate elements that are coupled together.

The annular flange 5 has a central hole 8 and a plurality of through fixing holes 9 arranged around the central hole 8 and adapted to allow the fixing of the bell 2 and hence of the brake disc 1 to a hub of a wheel, not illustrated.

The annular flange 5 also has a plurality of auxiliary small through holes 10 located in a radially more external position with respect to the fixing holes 9.

A plurality of first passages 11, defined by notches or cuts, are formed on a first radially peripheral edge of the annular flange 5 (FIG. 2). In the illustrated non-limiting embodiment, each notch 11 is radially open outward and is radially extended from the abovementioned edge towards the symmetry axis "X-X". Each notch also has a substantially rectangular shape with rounded inner edges. Two adjacent first passages 11 delimit a tooth between them that is extended for an arc of a circle. In the illustrated embodiment, the annular flange 5 has ten first passages 11 and ten teeth. A notch with arc of a circle shape 12 is also made on each tooth.

Figure 4:
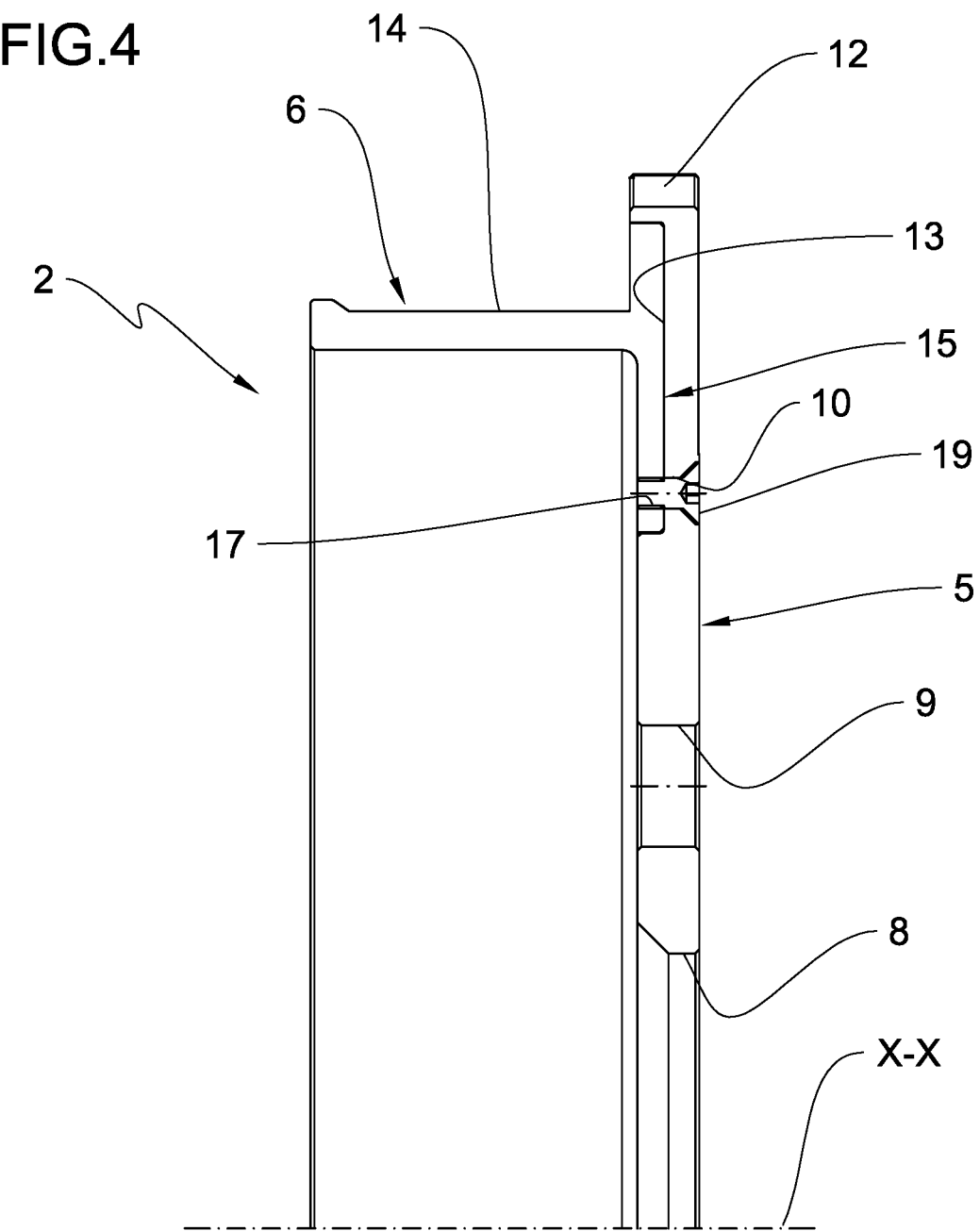
FIG. 4 is an enlargement of the bell of FIG. 3.

On one of the two faces of the annular flange 5, an annular recess 13 (visible in FIGS. 3 and 4) is made which is continuously extended around the symmetry axis "X-X". The annular recess 13 has a depth, measured along an axial direction, i.e. parallel to the symmetry axis "X-X", constant and equal to about half of a thickness of the annular flange 5. The annular recess 13 is partly extended on the teeth delimited by the first passages 11, i.e. it has a maximum (radially outer) diameter greater than an inner diameter of the first passages 11. The annular recess 13 has a minimum (radially inner) diameter smaller than a diameter of a circumference on which the auxiliary small holes 10 are positioned and greater than a diameter of a circumference on which the fixing holes 9 are positioned. In addition, the annular recess 13 does not interfere with the notches with arc of a circle shape 12, i.e. it remains in a radially more internal position with respect to said notches with arc of a circle shape 12 (FIG. 4). The first passages 11 are partially open in said at least one annular recess 13.

The drum 6 made of steel or cast iron is defined by a single piece which comprises a cylindrical body 14 and an auxiliary annular flange 15 positioned on a peripheral edge of the cylindrical body 14. The cylindrical body 14 is extended coaxially around the symmetry axis "X-X" and the auxiliary annular flange 15 lies in a plane orthogonal to said symmetry axis "X-X" on a head end of the cylindrical body 14. A maximum (radially outer) diameter of the auxiliary annular flange 15 is greater than an average diameter of the cylindrical body 14 and a minimum (radially inner) diameter of the auxiliary annular flange 15 is smaller than the average diameter of the cylindrical body 14. In other words, the cylindrical body 14 is connected to the auxiliary annular flange 15 in a radially intermediate zone thereof.

The auxiliary annular flange 15 has an outer diameter smaller than or equal to an outer diameter of the annular flange 5. The auxiliary annular flange 15 also has an inner diameter greater than an inner diameter of the annular flange 5.

The auxiliary annular flange 15 has a plurality of second passages 16, defined by notches or cuts, formed on a second radially peripheral edge belonging to the auxiliary annular flange 15 (FIG. 2).

In the illustrated non-limiting embodiment, each notch 16 is radially open outward and is radially extended from the abovementioned second edge towards the symmetry axis "X-X". Each notch 16 also has a substantially rectangular shape with rounded inner edges. Two adjacent second passages 16 delimit a tooth between them which is extended for an arc of a circle. In the illustrated embodiment, the auxiliary annular flange 15 has ten second passages 16 and ten teeth.

The auxiliary annular flange 15 also has a plurality of small through holes 17 located around a central opening 18 of the drum 6 and at a radially inner edge of the auxiliary annular flange 15.

The auxiliary annular flange 15 is counter-shaped with respect to the annular recess 13 and, when the bell 2 is mounted, it is accommodated in said annular recess 13. The maximum (radially outer) diameter of the auxiliary annular flange 15 is therefore about equal to the maximum (radially outer) diameter of the annular recess 13. The minimum (radially inner) diameter of the auxiliary annular flange 15 is therefore about equal to the minimum (radially inner) diameter of the annular recess 13. The auxiliary annular flange 15 has a thickness equal to about the depth of the annular recess 13 and, when it is accommodated in the annular recess 13, it lies flush with an outer surface of the flange 5.

Figure 5:
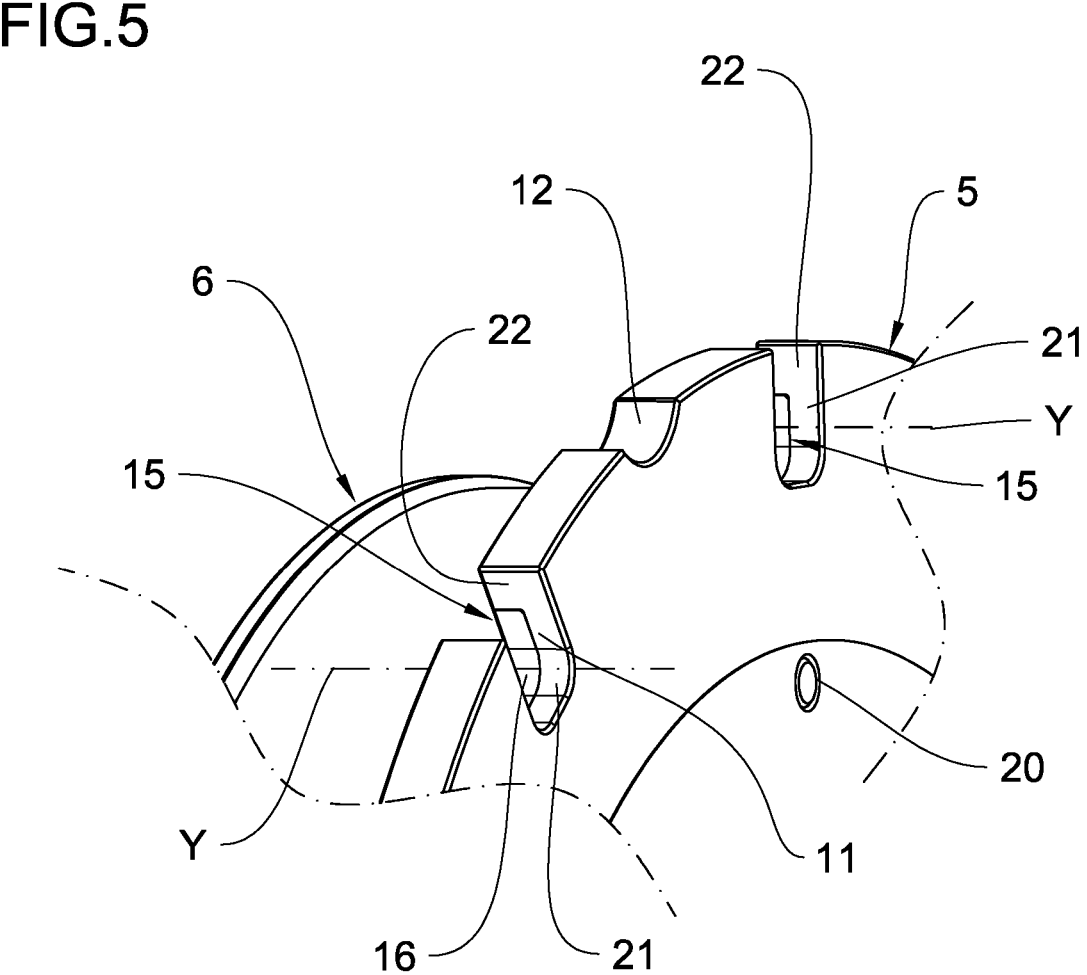
FIG. 5 is an enlargement of a portion of FIG. 1.

When the bell 2 is mounted, with the auxiliary annular flange 15 positioned in the annular recess 13, each of the small through holes 17 is aligned with a respective auxiliary small though hole 10 and screws 19 and pins 20 are located in said small holes 10, 17 and traverse the annular flange 5 and the auxiliary annular flange 15 in order to join them together and prevent rotary and axial movements (FIGS. 2, 3 and 4). As is visible in FIG. 1 and better illustrated in FIG. 5, the second passages 16 have the same shape as part of the first passages 11. The auxiliary annular flange 15 has, at the second passages 16, an outer diameter equal to an outer diameter presented by the annular flange 5 at the first passages 11.

In the assembled configuration of the bell 2, each of the first passages/notches 11 is axially aligned with a respective second passage/notch 16 in order to delimit a respective single axial passage 21 through the annular flange 5 and the auxiliary annular flange 15. As is better visible in FIG. 5, an axial relief 22 belonging to the radially outer edge of the teeth of the annular flange 5 is placed in a radially outer position with respect to a radially outer edge of the teeth of the auxiliary flange 15.

The annular flange 5 and the auxiliary annular flange 15, once coupled together, form an overall single annular flange configured for being coupled to the braking band 4. For such purpose, the single axial passages 21 are configured for being coupled with connecting devices, e.g. screws, bolts, rivets, operative between the bell 2 and the braking band 4, i.e. configured for joining the braking band to the bell and withstanding the mechanical and/or thermal forces and torques during operation (during braking). Such connecting devices were only schematically represented through their axes "Y" in FIG. 3. The connecting devices are accommodated in the single axial passages 21 and axially they tighten together radially inner portions of the braking band 4 and radially outer portions of the abovementioned overall single annular flange.

The auxiliary brake 7 of the "drum-in-hat" braking system is accommodated within the drum 6, as illustrated in FIG. 3. The auxiliary drum brake 7, of known type and therefore not illustrated in detail, comprises a support plate 23 configured for being integrally mounted on the vehicle. The support plate 23 bears a pair of jaws or brake shoes 24, of which only one is schematically represented in FIG. 3, which—when the auxiliary brake 7 is actuated—act against a radially inner surface 25 of the bell 2 in order to exert a braking force by friction.

The braking system of "drum-in-hat" type is therefore formed by the illustrated brake disc 2, 4, by the non-illustrated brake caliper, and by the auxiliary drum brake 7.

In an alternative and non-illustrated embodiment, the bell 2 is at least partially co-molded on the braking band 4 and a radially inner portion of the braking band 4 is inserted in each of the single axial passages 21. In this case, the use of connecting devices, e.g. screws, bolts, rivets, is not required.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A bell for a brake disc with an integrated drum-in-hat auxiliary brake, the bell comprising:
   an annular flange configured to be coupled to a braking band of the brake disc, wherein the annular flange includes outer faces on opposite sides of the annular flange;
   a drum coupled coaxially to the annular flange and including a cylindrical body and an auxiliary annular flange extending from a peripheral edge of the cylindrical body, wherein the drum accommodates or is configured to accommodate an auxiliary brake, wherein the annular flange and the drum are separate elements joined one to the other; and wherein the drum and the annular flange are made of different materials; and
   at least one annular recess in one of the outer faces of the annular flange;
   wherein the auxiliary annular flange seats in the at least one annular recess and the auxiliary annular flange is separable from the at least one annular recess; and
   wherein the auxiliary annular flange and the at least one annular recess share a common axis.

2. The bell according to claim 1, wherein a first radially peripheral edge of the annular flange has a plurality of first passages; wherein a second radially peripheral edge of the auxiliary annular flange has a plurality of second passages; wherein each of the first passages is axially aligned with a respective second passage to delimit a respective single axial passage through the annular flange and the auxiliary annular flange.

3. The bell according to claim 2, wherein the first passages and the second passages have respective notches or cuts formed respectively on the first radially peripheral edge and on the second radially peripheral edge.

4. The bell according to claim 1, wherein the annular flange is made of a light alloy and the drum is made of steel or cast iron.

5. A brake disc comprising:
   the bell according to claim 1, and
   a braking band radially external thereto, wherein the braking band and the bell extend around a common symmetry axis.

6. The brake disc according to claim 5, further comprising connecting devices operatively coupled to the braking band and to the bell, to rigidly link the braking band to the bell; wherein each of the connecting devices is placed in a first passage and in a second passage aligned with each other.

7. The brake disc according to claim 5, wherein the braking band is made of composite material; wherein the bell is metallic and is at least partly co-molded on the braking band.

8. A braking system comprising:
   a brake caliper,
   the brake disc according to claim 5, and
   an auxiliary brake located within the drum of the brake disc.

9. The brake system according to claim 8, wherein the auxiliary brake comprises at least one jaw configured, when the auxiliary brake is actuated, to act against an inner surface of the bell to exert a braking force by friction.

\* \* \* \* \*